United States Patent
Claudel et al.

(10) Patent No.: US 9,596,142 B2
(45) Date of Patent: Mar. 14, 2017

(54) WIRELESS PARTITIONED ON-BOARD TELECOMMUNICATION NETWORK

(71) Applicant: Airbus Operations (S.A.S.), Toulouse (FR)

(72) Inventors: Emilie Claudel, Tournefeuille (FR); Estelle Fouassier, Plaisance du Touch (FR); Juan Lopez, Grenade sur Garonne (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 125 days.

(21) Appl. No.: 14/304,608

(22) Filed: Jun. 13, 2014

(65) Prior Publication Data

US 2015/0003341 A1  Jan. 1, 2015

(30) Foreign Application Priority Data

Jun. 27, 2013 (FR) ...................... 13 56212

(51) Int. Cl.
*H04L 5/14* (2006.01)
*H04L 12/28* (2006.01)
*H04L 12/42* (2006.01)
*H04W 40/00* (2009.01)
*H04W 4/00* (2009.01)
(Continued)

(52) U.S. Cl.
CPC ......... *H04L 41/12* (2013.01); *H04B 7/18506* (2013.01); *H04W 12/08* (2013.01); *H04W 16/02* (2013.01); *H04L 63/0227* (2013.01); *H04L 67/12* (2013.01); *H04W 84/005* (2013.01); *H04W 84/06* (2013.01)

(58) Field of Classification Search
CPC .... H04L 41/12; H04L 63/0227; H04W 12/08; H04W 16/14
See application file for complete search history.

(56) References Cited

U.S. PATENT DOCUMENTS

| 8,391,788 B1* | 3/2013 | Mazuk | H04B 1/7163 |
|---|---|---|---|
| | | | 455/41.2 |
| 2003/0028641 A1* | 2/2003 | Zhang | H04L 12/5695 |
| | | | 709/226 |

(Continued)

OTHER PUBLICATIONS

AECC: "Draft 3 of ARINC project paper 664: Aircraft data network, Part 5: Network domain characteristics and interconnection", Internet Citation, Nov. 4, 2004, XP002398 177, URL: http://web.archive.org/web/20050205154616/www.arinc.com/aeec/draft_documents/664p5_d3.pdf.

(Continued)

*Primary Examiner* — Diane Lo
*Assistant Examiner* — Abu-Sayeed Haque
(74) *Attorney, Agent, or Firm* — Jenkins, Wilson, Taylor & Hunt, P.A.

(57) ABSTRACT

The subject matter disclosed herein relates an on-board network with nodes linked by wired links, the on-board network being partitioned into adjacent sub-networks, mutually segregated by security elements. Each sub-network can be equipped with access points allowing mobile terminals to connect to the sub-network by wireless links. The access points of adjacent sub-networks use different communication standards or distinct sets of transmission resources in such a way that the segregation between adjacent sub-networks is preserved.

12 Claims, 2 Drawing Sheets

(51) Int. Cl.
    *H04L 12/24*     (2006.01)
    *H04B 7/185*     (2006.01)
    *H04W 12/08*     (2009.01)
    *H04W 16/02*     (2009.01)
    *H04L 29/08*     (2006.01)
    *H04W 84/00*     (2009.01)
    *H04L 29/06*     (2006.01)
    *H04W 84/06*     (2009.01)

(56) References Cited

U.S. PATENT DOCUMENTS

| | | | | |
|---|---|---|---|---|
| 2004/0240457 | A1* | 12/2004 | Habetha | H04L 12/4625 370/401 |
| 2007/0014291 | A1* | 1/2007 | Zhang | H04L 12/185 370/390 |
| 2007/0115938 | A1* | 5/2007 | Conzachi | B64F 5/0045 370/352 |
| 2008/0090575 | A1* | 4/2008 | Barak | H04W 16/10 455/444 |
| 2008/0182573 | A1* | 7/2008 | Lauer | H04B 7/18506 455/431 |
| 2009/0092105 | A1* | 4/2009 | Chou | H04L 12/5695 370/337 |
| 2010/0223673 | A1* | 9/2010 | Scott | G06F 21/6218 726/28 |
| 2010/0246527 | A1* | 9/2010 | Montojo | H04L 25/0226 370/330 |
| 2012/0140778 | A1* | 6/2012 | Wang | H04W 72/005 370/475 |

OTHER PUBLICATIONS

French Search Report for Application No. 1356212 dated Feb. 28, 2015.

* cited by examiner

WIRELESS PARTITIONED ON-BOARD TELECOMMUNICATION NETWORK

CROSS-REFERENCE TO RELATED APPLICATION

This application claims priority to French Patent Application No. 13 56212 filed on Jun. 27, 2013, the entire content of which is incorporated by reference herein.

DESCRIPTION

Technical Field

The subject matter disclosed herein generally relates to the field of on-board telecommunication networks and more particularly that of networks partitioned into segregated sub-networks.

Background

The on-board networks on aircrafts are currently wired networks, for example AFDX (Avionics Full DupleX) networks or networks of ARINC 429 type.

Such an on-board network is generally partitioned into a first sub-network belonging to a secure area (avionic sub-network), and a second sub-network belonging to a non-secure area (open sub-network). The links within a sub-network can be two-way or one-way whereas the links between the two sub-networks are of necessity one-way, directed from the avionic sub-network towards the open sub-network, so as to prohibit access to the former from the latter.

This network partition makes it possible to reconcile the differing demands of avionic and non-avionic applications.

Indeed, it is essential to maintain a strict segregation between secure and non-secure areas for at least two reasons. First of all, it is necessary to prevent any accidental or malicious intrusion into the secure area, particularly any computer hacking that could originate in the open world. Next, it is important that the applications hosted in the open world do not disturb those hosted in the avionic area, i.e. compromise the deterministic behaviour of the latter.

More generally, it is known practice to partition a network into a plurality of distinct sub-networks, either at the physical level using one-way physical links between sub-networks to be segregated, or at a higher level of protocol, for example at the network level, by TCP/IP stream control, or else by an application gateway acting as firewall.

It is thus possible to partition the on-board network into a plurality of sub-networks each corresponding to distinct functions or to distinct access categories: avionic sub-network, aircraft maintenance sub-network, sub-network dedicated to the airline, sub-network dedicated to flight attendants (PNC), sub-network dedicated to passengers for a flight entertainment system IFE (In Flight Entertainment) and/or a telecommunication system for passengers.

However, such a partitioned on-board network does not currently support wireless links. Also, the terminals used on board an aircraft, whether by the crew, flight attendants, maintenance operators, or passengers are of necessity linked to the infrastructure of the on-board network by wired links.

FIG. 1 schematically represents a partitioned on-board network known from the prior art.

The network in question, 100, is here divided into N sub-networks, $110_1, \ldots, 110_N$, each sub-network belonging to a separate domain. For example, the sub-network $110_1$ can be an avionic sub-network, the sub-network $110_2$ can be a maintenance sub-network, the sub-network $110_N$ can be a sub-network dedicated to passenger entertainment.

The adjacent sub-networks are mutually segregated by security elements 120, for example one-way buffers, firewalls at packet level (filtering of TCP/IP ports) or at application level (application gateway).

In the case of segregation at the physical level, links between adjacent sub-networks are one-way and run from the sub-network having the highest degree of criticality to the sub-network having the lowest degree of criticality. On the other hand, links inside one and the same sub-network can be two-way.

When a terminal must be connected to the network, i.e. in practice to one of the sub-networks composing this network, a wired link must be provided between this terminal and a node of the sub-network.

However, the use of wired links has several drawbacks.

First of all, when a large number of terminals must be connected to the network (for example passenger terminals of the IFE system), the weight of the cables and of the associated connection technology puts a strain on the weight budget of the aircraft.

Next, the wired links are subjected to installation constraints because they must follow particular cable paths, which leads to long lengths of connection and further taxes the weight budget.

Furthermore, the wired links and associated connectors must be managed as additional replacement parts, the connectors being moreover subject to frequent replacements.

Finally, the use of wired links makes maintenance operations difficult: when the faulty equipment to be inspected is remote from the maintenance server, the maintenance operator cannot simultaneously access the maintenance documentation and the equipment in question.

The replacement of wired links by wireless links would make it possible to solve the difficulties mentioned above but this replacement cannot be carried out in an ordinary manner. Indeed, care must be taken that a user equipped with a mobile terminal having authorization to access a sub-network cannot access another sub-network for which they do not have access authorization.

The subject of the subject matter disclosed herein is consequently to propose a partitioned on-board network making it possible to remedy all or part of the aforementioned drawbacks, in particular to allow the use of wireless links for accessing the network, without running the risk of affecting the segregation between sub-networks.

SUMMARY

The subject matter disclosed herein is defined by an on-board network on board an aircraft, partitioned into a plurality of adjacent sub-networks, two sub-networks being adjacent if at least one physical link links them, the physical links between two adjacent sub-networks being each equipped with a security element to segregate the two adjacent sub-networks, at least a first and a second adjacent sub-network being each equipped with at least one wireless access point, the access points respectively equipping the first and second adjacent sub-networks using different communication standards or separate sets of communication resources.

Thus, each of the first and second adjacent sub-networks can be extended by wireless links while preserving the same segregation constraints as those of their wired infrastructure.

In a first variant, the access points respectively equipping any two adjacent sub-networks use different communication standards, the standards being chosen from among a group comprising the standards Wi-Fi, Wi-MAX, Bluetooth, GSM, UMTS, LTE-Advanced and Li-Fi.

In a second variant, the access points equipping any two adjacent sub-networks use a common communication standard and separate sets of transmission resources, the transmission resources being chosen from among a group comprising transmission frequencies, frequency chunks of an OFDM multiplex, transmission time intervals, transmission codes, transmission beams, or a combination of the transmission resources mentioned above.

In a third variant, for a first plurality of sub-networks, the access points respectively equipping any two adjacent sub-networks of this first plurality use different communication standards, the standards being chosen from among a group comprising the standards Wi-Fi, Wi-MAX, Bluetooth, GSM, UMTS, LTE-Advanced and Li-Fi, and for a second plurality of sub-networks, the access points equipping any two adjacent sub-networks of this second plurality use a common communication standard and separate sets of transmission resources, the transmission resources being chosen from among a group comprising transmission frequencies, frequency chunks of an OFDM multiplex, transmission time intervals, transmission codes, transmission beams, or a combination of the transmission resources mentioned above.

At least one sub-network can be equipped with an access controller, the access controller being linked to at least one access point of the sub-network and managing a set of transmission resources that can be used by this access point to establish communication with mobile terminals.

The network can comprise a plurality of access controllers as well as a central controller, the central controller allocating to each access controller a set of transmission resources that is dedicated to it.

Alternatively, the network can comprise a plurality of access controllers, the access controllers of adjacent networks deciding sets of transmission resources that are respectively dedicated to them.

Advantageously, in the case of the aforementioned first variant, the network can re-use one and the same communication standard for at least two non-adjacent sub-networks.

Advantageously, in the case of the aforementioned second variant, the network can re-use one and the same set of communication resources for at least two non-adjacent sub-networks.

Finally, the subject matter disclosed herein relates to an aircraft comprising an on-board network on board as described previously.

BRIEF DESCRIPTION OF THE DRAWINGS

Other features and advantages of the subject matter disclosed herein will become apparent upon reading a preferred embodiment of the subject matter disclosed herein, with reference to the attached figures among which.

DETAILED DESCRIPTION

In the following text an on-board network partitioned into a plurality of sub-networks as described in the introduction will be the subject of consideration. The adjacent sub-networks, i.e. those linked by at least one physical link, are segregated by a security element. This security element can operate at the physical layer (one-way buffer to make the link one-way) or at a higher level of protocol by a flow control (packet filtering according to their TCP/IP ports) or even of an application gateway acting as firewall.

Figure 2:
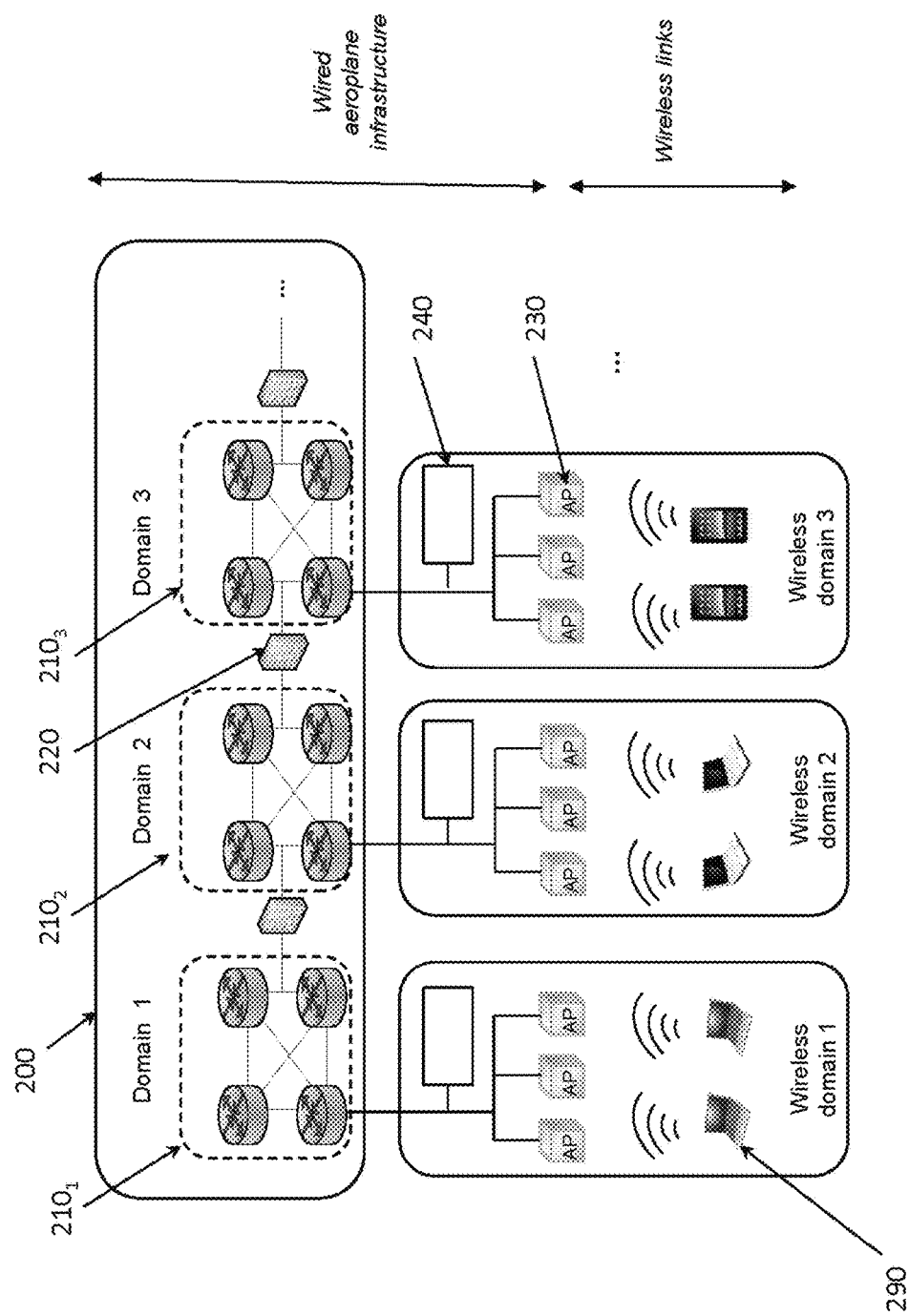
FIG. 2 schematically illustrates the architecture of an on-board network partitioned into segregated sub-networks according to an exemplary embodiment of the subject matter disclosed herein.

FIG. 2 schematically represents an on-board network partitioned into segregated sub-networks, according to an exemplary embodiment of the subject matter disclosed herein.

The on-board network 200 is composed of nodes linked by wired links, the nodes being able to be frame switches (in the case of an AFDX network or of an Ethernet network), repeaters, or else packet routers. The wired links can be electrical or optical links.

The on-board network is partitioned into sub-networks $210_1, \ldots, 210_N$, each sub-network belonging to a separate domain as already described with reference to FIG. 1.

Figure 1:
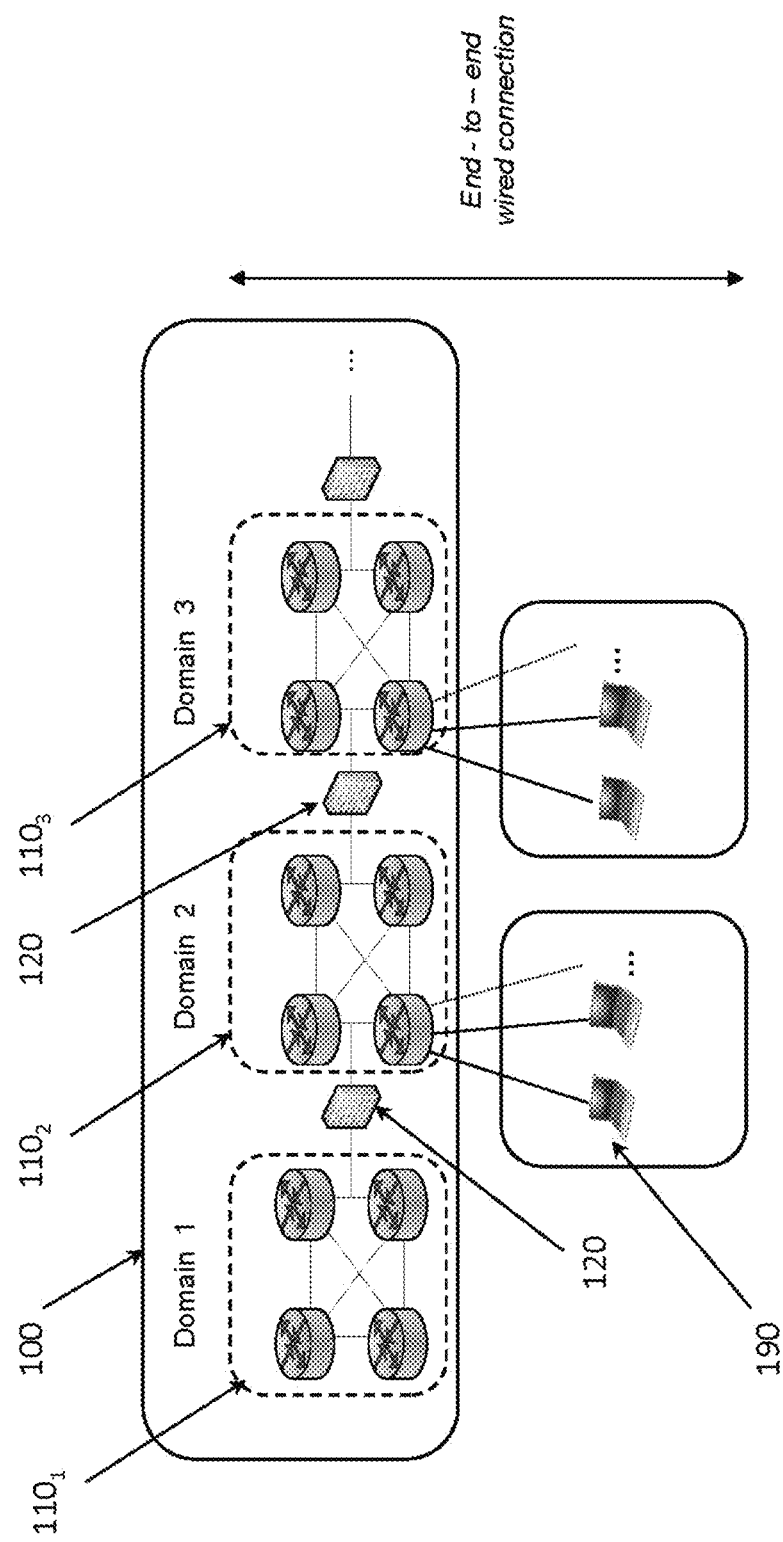
FIG. 1 schematically illustrates an example of an on-board network partitioned into segregated sub-networks, known from the prior art.

The various sub-networks can be linked using a linear topology as represented in FIG. 1. However, generally, the various sub-networks can be linked according to any graph. Notably, each sub-network can be adjacent to one or more other sub-networks.

The segregation of any two adjacent sub-networks from the network is ensured by a security element 220 on the physical link that links them. It will be noted that if two adjacent sub-networks are linked by a plurality of physical links, each of them is equipped with such a security element. Thus, if the segregation is performed at the physical level, all the links between the two adjacent sub-networks are one-way.

Contrary to the prior art, at least one first and one second adjacent sub-network are each equipped with at least one access point AP, 230. By access point is understood a radio access point such as a Wi-Fi (IEEE 802.11) access terminal, a Wi-MAX (IEEE 802.16) access point, a Bluetooth access point or else a 3G or 4G base terminal of a cell or a pico-cell. Alternatively, the access point can use an optical transmission/reception, for example be a Li-Fi access point.

Whatever the technology used, the access points of the first sub-network use a communication standard, respectively a transmission resource, distinct from the communication standard, respectively of the transmission resource, used by the access points of the second sub-network. More generally, any two adjacent sub-networks of the partitioned network differ in that their respective access points use different communication standards or separate sets of transmission resources.

By transmission resources is understood notably transmission time intervals in a temporal frame (TDMA for Time Division Multiple Access system), transmission frequencies (FDMA for Frequency Division Multiple Access system), frequency chunks of an OFDM multiplex (OFDMA pour Orthogonal Frequency Division Multiple Access system), transmission codes (CDMA for Code Division Multiple Access system), spatially separated transmission beams (SDMA for Space Division Multiple Access system), or else combinations of the aforementioned elementary transmission resources.

These transmission resources are allocated to communications between the access points and the mobile terminals 290 by access point controllers (hereinafter simply known as access controllers), 240, either in a centralized manner, or in an autonomous manner, or else in a distributed manner, as explained further on. More precisely, an access controller is linked to a cluster of access points of a sub-network and attributes communication resources to the mobile terminals 290 wishing to connect to the sub-network in question.

In a first variant, the access points of two adjacent sub-networks implement different communication standards, the access controllers of these two sub-networks manage the allocation of transmission resources in an autonomous manner. Indeed, the segregation of communications over the wireless links being provided by different standards, each access controller can manage its transmission resources independently.

In a second variant, the access points of two adjacent sub-networks implement the same communication standard but use separate sets of transmission resources. Thus the access point of a first sub-network possesses a first set of resources and the access point of a second sub-network, adjacent to the first, possesses a second set of resources, separate from the first.

The allocation of the first and second sets of communication resources can be carried out once and for all, in which case, the management of the resources is either autonomous, as previously, or carried out under the supervision of a central controller.

In the second aforementioned case, the central controller periodically attributes to the access controllers separate sets of resources, the number of resources in each set being for example chosen as a function of the number of communications expected. Each access controller allocates to the mobile terminals wishing to be connected, resources of the set that have been attributed to it by the central controller. It is thus understood that the management is distributed between the central controller and the access controllers. The management of resources can be ensured by a SNMP protocol (Simple Network Management Protocol), in a manner known per se. To do this, each access controller containing a software agent and a database MIB (Management Information Base) containing the resources to be allocated. The central controller plays the part of management station NMS (Network Management Station) in the sense of the SNMP protocol and contains a master database representing all the transmission resources and the associated management information.

In a third case, the access controllers negotiate amongst themselves sets of communication resources, without intervention from a central controller. This however assumes that the segregation of the sub-networks is not carried out at the physical level but by flow control, in such a way that the access controllers can exchange control messages through the network. By default the access controllers can exchange messages over an auxiliary channel segregated with respect to the communication infrastructure.

Whatever the mode of management envisaged, the sets of transmission resources allocated to two adjacent networks are separate. This does not exclude the re-use of transmission resources for non-adjacent sub-networks, notably when these resources are limited in number with respect to the number of mobile terminals to be connected and/or when the quality of service (QoS) or bandwidth requirements of the various communications are considerable.

Thus, a re-use of the transmission resources can be provided every M<N, M 2, adjacent sub-networks. If $S_1, \ldots, S_M$ denotes the sets of transmission resources of the M first sub-networks in the order of adjacency, with $S_i S_j$, i,j=1, ..., M, the set of resources $S_1$ can be re-used for the sub-network $R_{M+1}$, the set of resources $S_2$ by the network $R_{M+2}$, etc.

The re-use of resources is not limited to a linear topology, but it can apply to any topology of the sub-networks by applying a predetermined two-dimensional re-use scheme.

The cycle M of resource re-use depends on the spatial separation of access points relative to the various sub-networks as well as their emitting power. Generally, the re-use cycle must be chosen sufficiently large so that a terminal cannot communicate simultaneously with two distinct sub-networks.

Similarly, in the first variant, a re-use of one and the same communication standard can be provided every M first sub-networks $R_1, \ldots, R_M$, in the order of adjacency, the access points of the sub-networks of the networks $R_1, \ldots, R_{M-1}$ being all different. There again, the standard re-use cycle will be chosen to be sufficiently long that a terminal cannot communicate simultaneously with two distinct sub-networks.

In a third variant, the access points equipping certain adjacent sub-networks will be able to use different communication standards as in the first variant, and the access points equipping the other adjacent sub-networks will use a common communication standard but use separate sets of transmission resources as in the second variant. For example, it is possible to envisage that the avionic sub-network uses a first standard and that the other sub-networks use a second common standard, distinct from the first standard, the segregation between these other sub-networks being performed by separate sets of transmission resources.

Whatever the variant envisaged, those skilled in the art will understand that the use of distinct communication standards or separate sets of transmission resources by access points belonging to adjacent sub-networks makes it possible to preserve the segregation relationship of the wired infrastructure. A communication originating from or intended for a mobile terminal will thus be subjected to the same segregation constraints as a communication originating from or intended for a stationary terminal linked to the sub-network by a wired link.

The invention claimed is:

1. An on-board network on board an aircraft, the network comprising nodes linked by wired links and being partitioned into a plurality of sub-networks, two sub-networks being adjacent if at least one of the wired links them, the wired links between two adjacent sub-networks being each equipped with a security element to segregate the two adjacent sub-networks, wherein at least a first and a second adjacent sub-network are each equipped with at least one wireless access point, and wherein the first and second adjacent sub-networks belong to different communication domains, the access points respectively equipping the first and second adjacent sub-networks using different communication standards or separate sets of communication resources;

wherein the access points equipping any two adjacent sub-networks use a common communication standard and separate sets of transmission resources; and wherein the on-board network re-uses the separate sets of transmission resources every M<N, M≥2, adjacent sub-networks, wherein M is an integer designating a cycle of resource re-use, and wherein N is a total number of sub-networks.

2. The on-board network according to claim 1, wherein the access points respectively equipping any two adjacent sub-networks use different communication standards, the standards being chosen from among a group comprising the standards Wi-Fi, Wi-MAX, Bluetooth, GSM, UMTS, LTE-Advanced and Li-Fi.

3. The on-board network according to claim 2, wherein it re-uses one and the same communication standard for at least two non-adjacent sub-networks.

4. The on-board network according to claim 1, the transmission resources being chosen from among a group comprising transmission frequencies, frequency chunks of an OFDM multiplex, transmission time intervals, transmission codes, transmission beams, or a combination of the transmission resources mentioned above.

5. The on-board network according to claim 4, wherein at least one sub-network is equipped with an access controller, the access controller being linked to at least one access point of the sub-network and managing a set of transmission resources that can be used by this access point to establish communication with mobile terminals.

6. The on-board network according to claim 5, comprising a plurality of access controllers as well as a central controller, the central controller allocating to each access controller a set of transmission resources that is dedicated to it.

7. The on-board network according to claim 5, comprising a plurality of access controllers, the access controllers of adjacent networks deciding sets of transmission resources that are respectively dedicated to them.

8. The on-board network according to claim 4, wherein it re-uses one and the same set of communication resources for at least two non-adjacent sub-networks.

9. The on-board network according to claim 1, wherein for a first plurality of sub-networks, the access points respectively equipping any two adjacent sub-networks of this first plurality use different communication standards, the standards being chosen from among a group comprising the standards Wi-Fi, Wi-MAX, Bluetooth, GSM, UMTS, LTE-Advanced and Li-Fi, and that, for a second plurality of sub-networks, the access points equipping any two adjacent sub-networks of this second plurality use a common communication standard and separate sets of transmission resources, the transmission resources being chosen from among a group comprising transmission frequencies, frequency chunks of an OFDM multiplex, transmission time intervals, transmission codes, transmission beams, or a combination of the transmission resources mentioned above.

10. An aircraft comprising an on-board network on board according to claim 1.

11. The on-board network of claim 1, wherein the first sub-network is a secure avionic sub-network, wherein the second sub-network is an open sub-network, and wherein the security element is configured to allow network traffic from the secure avionic sub-network to the open sub-network and to prohibit network traffic from the open sub-network to the secure avionic sub-network.

12. The on-board network of claim 1, wherein $S_1, \ldots, S_M$, denotes the sets of transmission resources of the M first sub-networks $R_1, \ldots, R_M$, in the order of adjacency, with $S_i \cap S_j = \emptyset$, $i,j=1, \ldots, M$, and wherein the on-board network re-uses the set of resources $S_1$ for the sub-network $R_{M+1}$, the set of resources $S_2$ by the network $R_{M+2}$, and so on up to $S_M$.

* * * * *